United States Patent [19]

Shimokawa et al.

[11] 4,298,933
[45] Nov. 3, 1981

[54] DATA-PROCESSING DEVICE INCLUDING MEANS TO SUPPRESS THE EXECUTION OF UNNECESSARY INSTRUCTIONS

[75] Inventors: Yoshiyuki Shimokawa, Hachioji; Itaru Tanimoto, Fuchu, both of Japan

[73] Assignee: Tokyo Shibaura Denki Kabushiki Kaisha, Kawasaki, Japan

[21] Appl. No.: 54,577

[22] Filed: Jul. 3, 1979

[30] Foreign Application Priority Data

Jul. 8, 1978 [JP] Japan .................................. 53-83207
Jul. 8, 1978 [JP] Japan .................................. 53-83209

[51] Int. Cl.³ .............................................. G06F 9/00
[52] U.S. Cl. .................................................. 364/200
[58] Field of Search ... 364/200 MS File, 900 MS File

[56] References Cited

U.S. PATENT DOCUMENTS 3,815,099  6/1974  Cohen et al. ..................... 364/200
4,107,785  8/1978  Seipp ................................ 364/900

FOREIGN PATENT DOCUMENTS 52-155028  12/1977  Japan .

*Primary Examiner*—Raulfe B. Zache
*Attorney, Agent, or Firm*—Oblon, Fisher, Spivak, McClelland & Maier

[57] ABSTRACT

A data processing device which may execute instructions in less time by suppressing the execution of certain instructions which may be unnecessary. The device includes a memory unit, a processing unit for carrying out logic and arithmetic operations and a bit accumulator for holding the result of the logic operation. For example, if the first input to an AND operation is zero, the remaining steps are unnecessary and may be suppressed.

15 Claims, 11 Drawing Figures

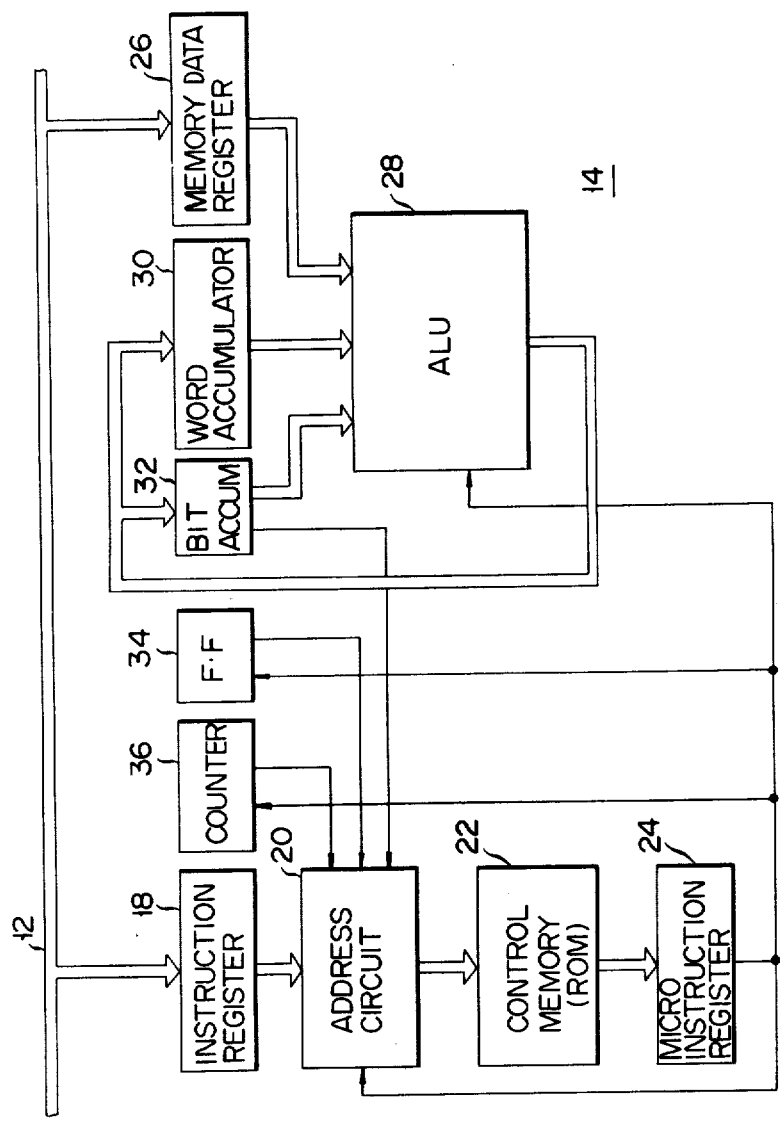

DATA-PROCESSING DEVICE INCLUDING MEANS TO SUPPRESS THE EXECUTION OF UNNECESSARY INSTRUCTIONS

This invention relates to a data-processing device which can shorten the average execution time of instructions by suppressing the execution of one or thereat more of the following instructions included in a processing program when certain prescribed conditions are established.

A process control by a data-processing device is often carried out by the prior art sequential processing system using a relay or arithmetical operation processing system as applied in the proportion-integration-differentiation (abbreviated as "PID") control. As a result, there have been developed a sequential controller only undertaking a sequential control and a data-processing device carrying out a 1-bit logic operation as used in the sequential control and an arithmetic operation based on a plurality of bits as applied in the PID control.

With a logic operation used in the prior art sequential control, a logic product or AND instruction for providing a logic product of the previously obtained logic operation result and an operand data, and a logic sum or OR instruction for providing a logic sum of the previously obtained logic operation result and operand data have never failed to be executed. When a logic operation result indicates a logic level of "0", a result of executing the AND instruction always shows a logic level of "0". Where a logic operation result shows a logic level of "1", a result of executing the OR instruction always indicates a logic level of "1". There will now be described the above-mentioned relationships by reference to FIGS. 1a to 1d showing logic circuits operated by applying the prior art relay circuit. Throughout the figures, the characters A, B, C denote relay contacts. The character Y represents a relay coil. Now let it be assumed that the closed and open conditions of the contacts A, B, C are represented by the logic levels of "1" and "0" respectively, and the energized and unenergized conditions of the relay coil Y are denoted by the logic levels of "1" and "0" respectively. Then, the types of the logic circuit of FIGS. 1a, 1b, 1c, and 1d may be expressed by the following logic formulas:

| | |
|---|---|
| 1a | A AND B = Y |
| 1b | A OR B = Y |
| 1c | A AND (B OR C) = Y |
| 1d | A OR (B AND C) = Y |

Where, in the case of the logic circuit of FIG. 1a, the contact A is opened, that is, A=0 as a logic level, then a logic output Y from the relay coil has a logic level of "0" regardless of the logic level condition of the contact B, eliminating the necessity of carrying out a logic operation of "AND B". Where, in the case of the logic circuit of FIG. 1b, the contact A is closed, that is, A=1 as a logic level, then a logic output Y from the relay coil has a logic level of "1", regardless of the logic level condition of the contact B, eliminating the necessity of carrying out a logic operation of "OR B". Where, in the case of the logic circuit of FIG. 1c, the contact A is opened, that is, A=0 as a logic level, then a logic output Y from the coil has a logic level of "0" regardless of the result of an arithmetic operation expressed by B OR C enclosed in parenthesis, eliminating the necessity of carrying out a logic operation of "AND (B OR C)". Where, in the case of the logic circuit of FIG. 1d, the contact A is closed, that is, A=1 as a logic level, then a logic output Y from the relay coil Y has a logic level of "1", regardless of the result of a logic operation expressed by "B AND C" enclosed in parentheses, eliminating the necessity of carrying out a logic operation of "OR (B AND C)". In other words, the prior art data-processing device has undertaken wasteful operations.

FIG. 2 shows a flow chart of the execution of an instruction according to the prior art microprogram. A machine instruction is generally formed of an operation code part denoting the function of an instruction and an operand address part indicating the address of an operand data. Referring to FIG. 2, an operation code part is first read out of a memory during an instruction fetch cycle. Then the operand address part is read out of a memory, a required address number is counted by carrying out, for example, the modification of an index. The operand data part is read out of a memory according to the address number which has been thus counted. Last, an instruction is executed to carry out a logic operation. Thereafter, an instruction-executing procedure is returned to the first instruction. As described above, the prior art data-processing device has carried out operations including not only the counting of the numbers of the first and succeeding addresses, but also the last execution of an instruction, even where the result of an logic operation is known beforehand as in the case, where the already obtained result of a logic operation has a logic level of "0" and the corresponding AND instruction is executed, or as in the case, where the already obtained result of a logic operation has a logic level of "1" and the corresponding OR instruction is executed. Accordingly, the prior art data-processing device has consumed unnecessarily long time due to the above-mentioned wasteful operations.

Further, a program set in the conventional data-processing device often has a conditional branch instruction or any other similar instruction. A program including a large number of such conditional branch instructions becomes too much complicated to be easily understood. Moreover, where an instruction other than a conditional branch instruction is inserted between said conditional branch instruction and an instruction to be branched off by said branch instruction, then a different address number from that of the address in which the branch instruction is stored will be counted. Therefore, it is necessary to count again the number of the correct address of a required branched instruction by recompiling the above-mentioned program.

This invention has been accomplished in view of the above-mentioned circumstances, and is intended to provide a data-processing device which can shorten the average execution time of instructions by suppressing the execution of one or more of the following instructions included in a processing program when certain prescribed conditions are established and whose processing program contains an easily understandable instruction in place of the aforesaid conditional branch instruction in order to be saved from complications.

To attain the above-mentioned object, this invention provides a data-processing device comprising:

Memory means for storing data and machine instructions;

processing means for carrying out the logic operation of at least 1-bit data and the arithmetic operation of data expressed by a plurality of bits, and, under predetermined conditions, suppressing the execution of one or some following instructions included in a processing program; and means for transmitting data between external equipment and the memory means or processing means.

A data-processing device embodying this invention shortens the average execution time of instructions by omitting operations extending from the counting of an address number and the execution of an instruction, where the result of a logic operation is known beforehand, as in the case, where the already obtained result of a logic operation has a logic level of "0" and an AND instruction is executed, or as in the case, where the already obtained result of a logic operation has a logic level of "1" and an OR instruction is executed.

A processing program used with a data-processing device embodying this invention contains in place of the aforesaid conditional branch instruction a gate instruction * included in a machine instruction. Where the predetermined conditions, are established, the gate instruction commands the execution of instructions included between an instruction for specifying or inserting a preceding parenthesis "("and an instruction for specifying or inserting a succeeding parenthesis")". Where the predetermined conditions are not satisfied, then the gate instruction * treats instructions included between the above-mentioned parentheses as those whose execution is to be suppressed. These nonoperated instructions are designated as "NOP".

This invention can be more fully understood from the following detailed description when taken in conjunction with the accompanying drawings, in which:

FIGS. 1a to 1d indicate the arrangements of prior art logic circuits each using a relay circuit;

FIG. 4 is a block circuit diagram of a processing unit used with the data-processing device of the invention;

Figure 3:
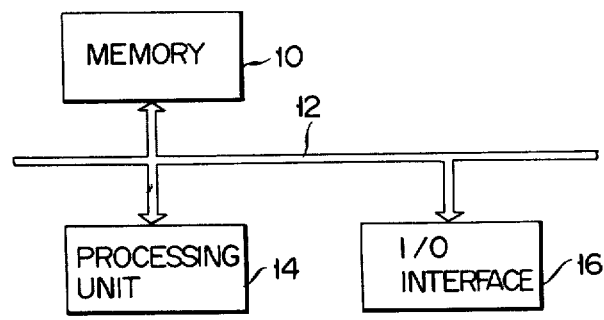
FIG. 3 is a block circuit diagram showing the fundamental arrangement of a data-processing device embodying this invention.

There will now be described by reference to the accompanying drawings the arrangement and operation of a data-processing device embodying this invention. FIG. 3 shows the fundamental arrangement of a data-processing device embodying this invention. A memory 10 for storing data and machine instructions is connected to a processing unit 14 through a bus 12. This processing unit 14 carries out the reading, decoding and execution of the machine instruction in accordance with the microprogram. Connected to the bus 12 is an input-output interface 16 for carrying out the transmission of data between the memory 10 or processing unit 14 and external equipment (not shown).

FIG. 4 is a block circuit diagram showing the concrete arrangement of the processing unit 14. A machine instruction read out of the memory 10 (not shown) is stored in an instruction register 18 through the bus 12. Data indicated by the operation code part of the instruction register 18 is supplied to an address circuit 20. This address circuit 20 selects the contents of either the operation code part of the instruction register 18 or the later described microinstruction register 24 in accordance with the contents of the later described bit accumulator 32, flip-flop circuit 34 or counter 36. Thus, the address circuit 20 designates the address of the control memory (or ROM) 22 in which the microprogram is stored. A microinstruction read out of the control memory 22 is stored in the microinstruction register 24. In accordance with the contents of a microinstruction delivered from the memory 22 to the microinstruction register 24, the address data of the address circuit 20 is read out, an operation instruction for the later described operation circuit (ALU) 28 is issued, a set-reset instruction for the later described flip-flop circuit 34 is given, and a up- or down-counting instruction for the later described counter 36 is sent forth. Operand data read out of the memory 10 is stored in a memory data register 26, whose contents are supplied to the ALU 28. This ALU 28 carries out the logic operation of the contents of a word accumulator 30 for storing the result of an arithmetic operation, or the contents of a bit accumulator 32 for storing the result of a logic operation, and the contents of the memory data register 26 in accordance with the contents of the operation instruction issued from the microinstruction register 24. The results of the above-mentioned logic operation are supplied to the word accumulator 30, or bit accumulator 32. Output data from the bit accumulator 32 is conducted to the address circuit 20. This address circuit 20 is supplied with an output signal from a flip-flop circuit (flag resistor) 34 instructing the nonexecution of an instruction and a signal whose logic level is changed to "1" when the contents of the counter 36 for counting the number of paretheses included in a processing program indicate a logic level of "0", and whose logic level is changed to "0" when said contents do not show a logic level of "0".

Figure 5:
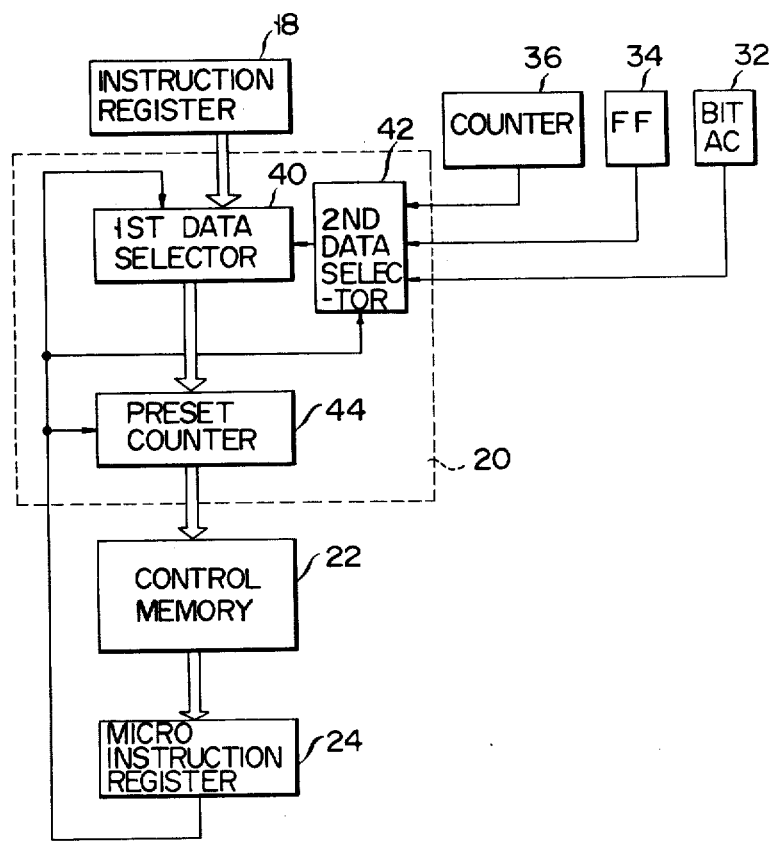
FIG. 5 shows the detailed arrangement of the address circuit of FIG. 4.

FIG. 5 shows the concrete arrangement of the address circuit 20. A first data selector 40 selects either the contents of the instruction register 18 or the contents of the microinstruction register 24 in accordance with the contents of an output signal from a second selector 42. The selected data is supplied to a preset counter 44. This preset counter 44 carries out upcounting, each time a microinstruction is executed. Output data from the first data selector 40 is preset in the preset counter 44 in accordance with the contents of the microinstruction register 24. In accordance with the contents of the microinstructon register 24, the second data selector 42 supplies the first data selector 40 with one of the signals which indicate that the contents of the bit accumulator 32, those of the flip-flop circuit 34 and those of the counter 36 have a logic level of "0".

The ALU 28 of FIG. 4 can be easily formed of a marketed arithmetic logic unit. Since, however, the arrangement of said ALU 28 falls outside of the scope of this invention, a detailed drawing thereof is omitted.

The afore-said address circuit 20 and the ALU 28 may be constructed by, for example, model AM2909 and model AM2901 of Advanded Micro Devices INC, USA.

Figure 6:
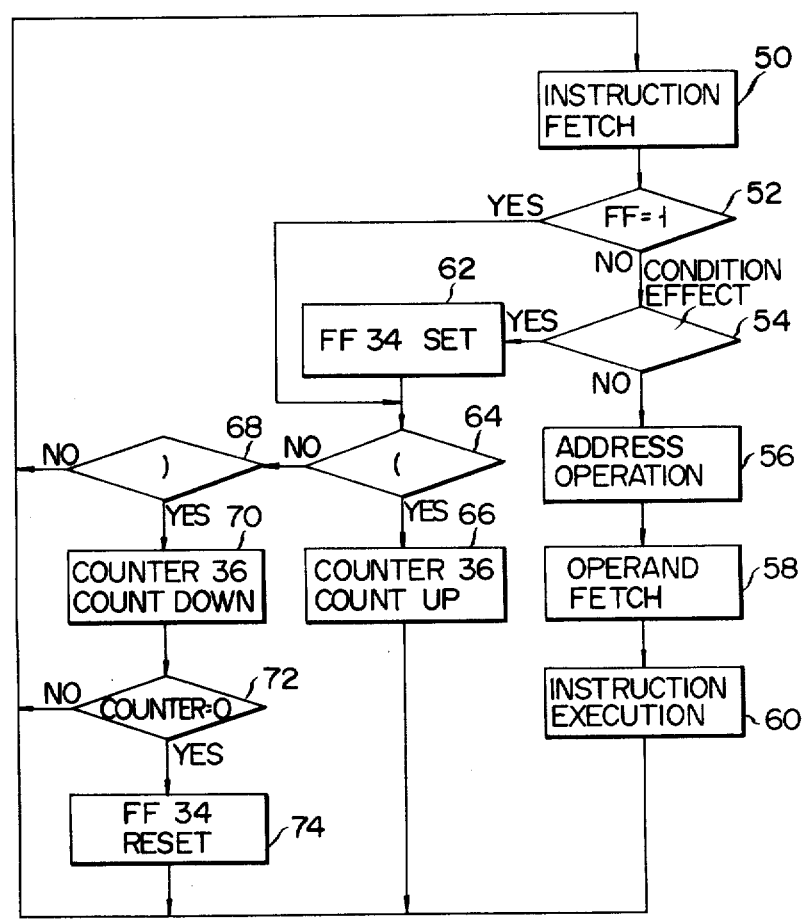
FIG. 6 is a flow chart of the execution of an instruction, showing a microprogram used with the data-processing device of the invention.

There will now be described by reference to the flow chart of FIG. 6 showing a microprogram used with the data-processing device of this invention and the operations of all the above-mentioned circuits related to the execution of an AND instruction and OR instruction. First, let it be assumed that the logic formula of a logic operation circuit does not include the aforesaid logic operation instruction enclosed in parentheses, namely, the contents of the counter 36 have a logic level of "0". Further, let it be supposed that the flip-flop circuit 34 is reset. As in the prior work data-processing device, an instruction is read out from the memory 10 to the instruction register 18, at Step 50. At Step 52, judgement is made as to whether the contents of the flip-flop circuit 34 has a logic level of "1" or "0". Since the contents of the flip-flop circuit 34 have a logic level of "0" as previously described, operation proceeds to Step 54a. At this Step 54, judgement is made as to whether the predetermined conditions are established. As used herein, the term "predetermined conditions" is defined to mean the basis on which judgement is made as to whether the contents of the bit accumulator 32 have a logic level of "0" when a machine instruction stored in the instruction register 18 denotes an AND instruction, or the contents of said bit accumulator 32 have a logic level of "1" when the machine instruction represents an OR instruction. Where the above-mentioned predetermined conditions are not established, then address operation, operand fetch and instruction execution are carried out at Steps 56, 58, 60 respectively, as in the prior work data-processing device. Thereafter, the operation of a processing program (instruction) goes back to Step 50. If the aforesaid predetermined conditions are established at Step 54, then the flip-flop circuit 34 is set at step 62. Judgment is made as to whether the preceding and succeeding parentheses are included in a processing instruction at Steps 64, 68 respectively. If the parentheses are not present, then the operation of the processing instruction is returned to Step 50. In other words, where the predetermined conditions are established, it is possible to eliminate steps ranging from the address operation to the instruction execution of Steps 56 to 60, thereby shortening the average execution time of instructions.

Where the contents of the flip-flop circuit 34 are found to have a logic level of "1" at Step 52, then the operation of the processing instruction proceeds to Step 64. Where if it is found at Step 64 that a preceding arithmetic parenthesis is present, then the counter 36 commences up-counting at Step 66. Thereafter, the operation of the processing instruction is returned to Step 50. Where it is found at Step 64 that a succeeding arithmetic parenthesis is present, then the operation of the processing instruction proceeds to Step 70 through Step 68. At step 70, the counter 36 commences down-counting. The operation goes on to Step 72. At this Step 72, judgment is made as to whether the contents of the counter 36 have a logic level of "0". Where the contents have not a logic level of "0", the operation of the processing instruction goes back to Step 50. Where the contents have a logic level of "0", then the flip-flop 34 is reset at Step 74. Thereafter, the operation is returned to Step 50.

Where an instruction is executed, determination is made, after the step of instruction fetch, as to whether the contents of the flip-flop circuit 34 have a logic level of "0". Where said contents have a logic level of "1", then judgment is only made as to whether the preceding or succeeding arithmetic parenthesis "("or")" is included in the processing instruction. Where it is found that the processing instruction contains neither the preceding nor the succeeding parenthesis (or), then the operation of said instruction goes back to the first Step 50. Where the preceding parenthesis "("is designated with an AND instruction, and the contents of the bit accumulator 32 have a logic level of "0", then the instruction scheduled to be issued during an interval defined between the designation of said preceding parenthesis "("and the designation of the succeeding parenthesis")" are operated as those whose execution is to be suppressed, that is, as "NOP". Where the preceding parenthesis "("is designated with an OR instruction, and the contents of the bit accumulator 32 have a logic of "1", then the instructions scheduled to be issued during an interval defined between the designation of said preceding parenthesis "("and the designation of the succeeding parenthesis")" are operated as those whose execution is to be suppressed, that is, as "NOP". Further, where a multiple parenthetical notation is included in a processing instruction, a correct logic operation can be carried out by counting the multiplicity of said parenthetical notation.

Where the gate instruction*, was already described in the Summary of the Invention, is issued, the same logic operation as described above ensues, except when the predetermined conditions established at Step 54 prescribes:

A machine instruction stored in the instruction register 18 denotes a gate instruction*, and the contents of the bit accumulator 32 have a logic level of "0".

Figure 1A:
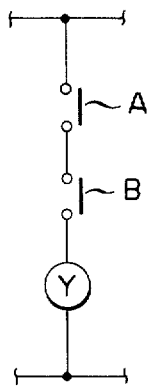
Figure 1B:
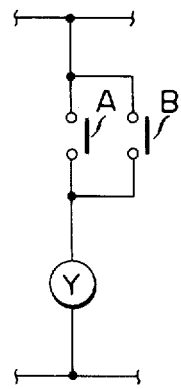
Figure 1C:
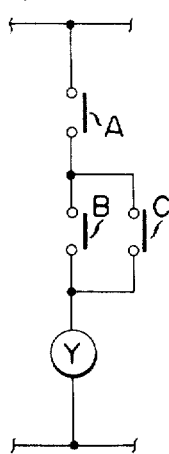
Figure 1D:
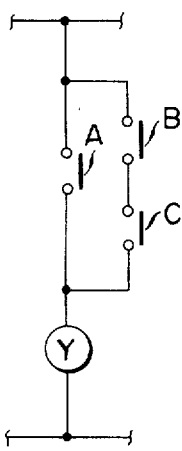
Figure 2:
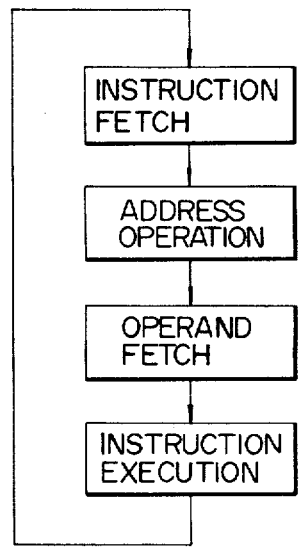
FIG. 2 is a flow chart of the execution of an instruction according to the prior art microprogram.

There will now be described the examples in which the gate instruction* is applied. The logic formula of the prior work logic operation circuit of FIG. 1c may be expressed as follows if the gate instruction* is applied:

$$A*(B \text{ OR } C) = Y$$

Where, in this case, the contact A is left open (A = 0 as a logic level), then an instruction "B OR C" is not executed by the gate instruction*, thereby shortening the average execution time of the whole processing program (instruction).

Figure 7:
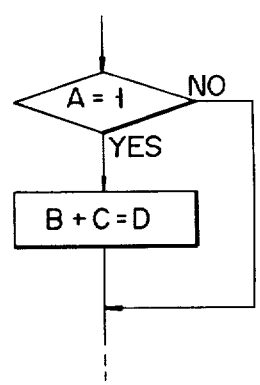
FIG. 7 is a flow chart, where a gate instruction is used in carrying out an arithmetic operation in accordance with the invention.

FIG. 7 is a flow chart of an arithmetic operation. The character A denotes 1-bit data. The flow chart is so arranged that an arithmetic operation of B+C=D is carried out when said 1-bit of data has a logic level of "1". The formula of the above-mentioned arithmetic operation may be expressed as follows, if the gate instruction* is applied.

$$A*(B+C=D)\ldots$$

This formula shows that if the condition "A=1" is not satisfied, the operation of "B+C=D" is jumped by the gate instruction*. Such an expression used with "*" renders a processing program far easier to see than when a branch instruction is used.

Where the results of a logic operation are known beforehand, the data-processing device of this invention suppresses the execution of sub instructions which command the logic operations whose results are known beforehand, thereby eliminating those steps of a processing instruction which extend from address operation to instruction execution.

The application of the gate instruction* as defined herein has the advantage that since only where the predetermined conditions are established, instructions enclosed in parentheses "("and")" are excuted, and where the predetermined conditions are not satisfied, said instructions are not executed, that is, operated as "NOP", even a sudden insertion of any other instruction during the operation of the original processing program does not lead to the necessity of recompiling said program due to, for example, the accidental reading of a different address number from that of a required one. Where, with the foregoing embodiment, the predetermined conditions are not established, instructions enclosed in the parentheses are not executed, or operated as "NOP". However, it is possible to provide a processing program in which, where said predetermined conditions are not established, the instructions enclosed in the parentheses are jumped.

Figure 8:
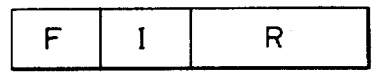
FIG. 8 shows an example of a format of a logic product instruction, a logic sum instruction or a gate instruction.

FIG. 8 shows an example of a format of the logic product instruction, the logic sum instruction or the gate instruction. This format is conventional. In this figure, the left side part denotes a function part, the center part an index part and the right part a field or an address part.

Although specific circuit constructions have been illustrated and described herein, it is not intended that the invention be limited to the elements, instructions and constructions disclosed. One skilled in the art will recognize that the particular elements, instructions or sub-constructions may be used without departing from the scope and spirit of this invention. For example, the instructions may be formed of conventional one, two, three or four address format.

What we claim is:

1. A data processing device comprising:
memory means for storing data and machine instructions;
processing means for carrying out the logic operation on at least 1-bit of data and the arithmetic operation on data formed of a plurality of bits, and, where a predetermined condition is established, suppressing the execution of one or more of the following instruction;
a bit accumulator connected to said processing means for holding the result of the logic operation on at least 1-bit of data, the contents of the bit accumulator being used as the predetermined condition; and
means for carrying out the transmission of data between external equipment and the memory means or processing means.

2. The data-processing device according to claim 1, wherein the machine instructions include a logic product instruction for providing a logic product of the bit contents stored in the memory means specified by the operand address of the machine instruction and the contents of the bit accumulator and causing said logic product to be stored in the bit accumulator; and a logic sum instruction for providing a logic sum of the bit contents stored in the memory means specified by the operand address of the machine instruction and the contents of the bit accumulator and causing said logic sum to be stored in the bit accumulator; and the processing means suppresses the execution of the logic product instruction when the contents of the bit accumulator have a logic level of "0", and suppresses the execution of the logic sum instruction when said contents have not a logic level of "0".

3. The data-processing device according to claim 2, wherein the processing means includes logic operation means for operating on instructions issued with respect to the preceding and succeeding parentheses used in the logic operation; and when the preceding parenthesis is specified with the logic product instruction and the contents of the bit accumulator have a logic level of "0", the processing means suppresses the execution of instructions immediately following said preceding parenthesis until the succeeding parenthesis is specified; and when the preceding parenthesis is specified with the logic sum instruction and the contents of the bit accumulator have not a logic level of "0", then the processing means suppresses the execution of instructions immediately following said preceding parenthesis until the succeeding parenthesis is specified.

4. The data-processing device according to claim 1, wherein the machine instructions include a gate instruction, which, when the contents of the bit accumulator have not a logic level of "0", commands the execution of instructions enclosed between the preceding parenthesis denoting the start of a logic or arithmetic operation and the succeeding parenthesis representing the end of the logic or arithmetic operation, and, when said contents have a logic level of "0", suppresses the execution of said instruction.

5. The data-processing device according to claim 4, wherein the processing means further includes means in which, when the preceding parethesis is specified with a logic product instruction and the contents of the bit accumulator have a logic level of "0", instructions enclosed between the preceding and succeeding parentheses are not executed to shorten the average execution time of instructions included in a processing program; when the preceding parenthesis is specified with a logic sum instruction and the contents of the bit accumulator have not a logic level of "0", instructions enclosed between the preceding and succeeding parentheses are not executed; and when the gate instruction is issued and the contents of the bit accumulator have a logic level of "0", then instructions enclosed between the preceding and succeeding parentheses are not executed.

6. The data-processing device according to claim 1, wherein the machine instructions include a logic product instruction for providing a logic product of the bit contents stored in the memory means specified by the operand address of the machine instruction and the contents of the bit accumulator and causing said logic product to be stored in the bit accumulator; a logic sum instruction for providing a logic sum of the bit contents stored in the memory means specified by the operand address of the machine instruction and the contents of the bit accumulator and causing said logic sum to be stored in the bit accumulator; a gate instruction, which, when the contents of the bit accumulator have not a logic level of "0", commands the execution of instructions enclosed between the preceding parenthesis denoting the start of a logic or arithmetic operation and the succeeding parenthesis representing the end of the logic or arithmetic operation, and, when said contents have a logic level of "0", suppresses the execution of said instructions; the processing means comprises a flag register, which, where the predetermined conditions are not established with the gate instruction, logic product instruction or logic sum instruction, is set upon detection of the preceding parenthesis and is reset upon detection of the succeeding parenthesis; and while the flag register is set, any of instructions between the preceding and succeeding parentheses is not executed.

7. The data-processing device according to claim 1, wherein the machine instructions include a logic product instruction for providing a logic product of the bit contents stored in the memory means specified by the operand address of the machine instruction and the contents of the bit accumulator and causing said logic product to be stored in the bit accumulator; a logic sum instruction for providing a logic sum of the bit contents stored in the memory means specified by the operand address of the machine instruction and the contents of the bit accumulator and causing said logic sum to be stored in the bit accumulator; and a gate instruction, which, when the contents of the bit accumulator have not a logic level of "0", commands the execution of instructions enclosed between the preceding parenthesis denoting the start of logic or arithmetic operation and the succeeding parenthesis representing the end of the logic or arithmetic operation, and, when said contents have a logic level of "0", suppresses the execution of said instruction; and the processing means further includes a counter for counting in which, to treat instructions issued with respect to a plurality of pairs of parentheses constituting a multiple parenthetical notation, the first mode counting is carried out upon detection of the preceding group of parentheses and the opposite second mode counting is carried out upon detection of the succeeding group of parentheses, both counting operations being undertaken when the predetermined conditions are not established with the gate instruction, logic product instruction or logic sum instruction.

8. The data-processing device according to claim 1, wherein the output of said processing means is connected to the input of said bit accumulator and the output of said bit accumulator is connected to the input of said processing means.

9. The data-processing device according to claim 1, wherein the said suppressing acts to reduce the time needed for the execution of the instructions.

10. A data-processing device comprising:
   memory means for storing data and machine instructions;
   processing means for carrying out the logic operation on at least 1-bit of data and the arithmetic operation on data formed of a plurality of bits, and, where a predetermined condition is established, suppressing the execution of one or more of the following instructions;
   a bit accumulator connected to said processing means for holding the result of the logic operation on at least 1-bit of data, the contents of the bit accumulator being used as the predetermined condition;
   a logic product instruction included in the machine instructions for providing a logic product of the bit contents stored in the memory means specified by the operand address of said logic product instruction and the contents of the bit accumulator, and the logic product instruction causing said logic product to be stored in the bit accumulator;
   a logic sum instruction included in the machine instructions for providing a logic sum of the bit contents stored in the memory means specified by the operand address of said logic sum instruction and the contents of the bit accumulator, and the logic sum instruction causing said logic sum to be stored in the bit accumulator;
   means for carrying out the transmission of data between external equipment and the memory means or processing means; whereby
   the processing means suppresses the execution of the logic product instruction when the contents of the bit accumulator have a logic level of "0" and suppresses the execution of the logic sum instruction when said contents have not a logic level of "0".

11. A data-processing device comprising:
   memory means for storing data and machine instructions;
   processing means for carrying out the logic operation on at least 1-bit of data and the arithmetic operation on data formed of a plurality of bits, and, where a predetermined condition is established, suppressing the execution of one or more of the following instructions;
   a bit accumulator connected to said processing means for holding the result of the logic operation on at least 1-bit of data, the contents of the bit accumulator being used as the predetermined condition;
   a gate instruction, which, when the contents of the bit accumulator have not a logic level of "0", commands the execution of instructions enclosed between the preceding parenthesis denoting the start of a logic or arithmetic operation and the succeeding parenthesis representing the end of the logic or arithmetic operation, and, when said contents have a logic level of 37 0", suppresses the execution of said instruction; and
   means for carrying out the transmission of data between external equipment and the memory means or processing means.

12. A data-processing device comprising:
   memory means for storing data and machine instructions;
   processing means for carrying out the logic operation on at least 1-bit of data and the arithmetic operation on data formed of a plurality of bits, and, where a predetermined condition is established, suppressing the execution of one or more of the following instructions;
   a bit accumulator connected to said processing means for holding the result of the logic operation on at least 1-bit of data, the contents of the bit accumulator being used as the predetermined condition;
   a logic product instruction included in the machine instructions for providing a logic product of the bit contents stored in the memory means specified by the operand address of the logic product instruction and the contents of the bit accumulator, and the logic product instruction causing said logic product to be stored in the bit accumulator;
   a logic sum instruction included in the machine instructions for providing a logic sum of the bit contents stored in the memory means specified by the operand address of the logic sum instruction and the contents of the bit accumulator, and the logic sum instruction causing said logic sum to be stored in the bit accumulator;
   logic operation means for operating on instructions issued with respect to the preceding and succeeding parentheses used in the logic operation; and
   means for carrying out the transmission of data between external equipment and the memory means or processing means; whereby
   when the preceding parenthesis is specified with the logic product instruction and the contents of the bit accumulator have a logic level of "0", the processing means suppresses the execution of instruction immediately following said preceding parenthesis until the succeeding parenthesis is specified; and when the preceding parenthesis is specified with the logic sum instruction and the contents of the bit accumulator have not a logic level of "0", then the processing means suppresses the execution of instructions immediately following said preceding parenthesis until the succeeding parenthesis is specified.

13. A data-processing device comprising:

memory means for storing data and machine instructions;

processing means for carrying out the logic operation on at least 1-bit of data and the arithmetic operation on data formed of a plurality of bits, and, where a predetermined condition is established, suppressing the execution of one or more of the following instructions;

a bit accumulator connected to said processing means for holding the result of the logic operation on at least 1-bit of data, the contents of the bit accumulator being used as the predetermined condition;

a logic product instruction included in the mechine instructions for providing a logic product of the bit contents stored in the memory means specified by the operand address of the logic product instruction and the contents of the bit accumulator, and the logic product instruction causing said logic product to be stored in the bit accumulator;

a logic sum instruction included in the machine instructions for providing a logic sum of the bit contents stored in the memory means specified by the operand address of the logic sum instruction and the contents of the bit accumulator, and the logic sum instruction causing said logic sum to be stored in the bit accumulator;

a gate instruction, which, when the contents of the bit accumulator have not a logic level of 37 0", commands the execution of instructions enclosed between the preceding parenthesis denoting the start of a logic or arithmetic operation and the succeeding parenthesis representing the end of the logic or arithmetic operation, and, when said contents have a logic level of "0", suppresses the execution of said instructions;

a flag register connected to said processing means, which, where the predetermined conditions are not established with the gate instruction, logic product instruction or logic sum instruction is set upon detection of the preceding parenthesis and is reset upon detection of the succeeding parenthesis; and means for carrying out the transmission of data between external equipment and the memory means or processing means; whereby while the flag register is set, any of instructions between the preceding and succeeding parentheses is not executed.

14. A data-processing device comprising:

memory means for storing data and machine instructions;

processing means for carrying out the logic operation on at least 1-bit of data and the arithmetic operation on data formed of a plurality of bits, and, where a predetermined condition is established, suppressing the execution of one or more of the following instructions;

a bit accumulator connected to said processing means for holding the result of the logic operation on at least 1-bit of data, the contents of the bit accumulator being used as the predetermined condition;

a logic product instruction included in the machine instructions for providing a logic product of the bit contents stored in the memory means specified by the operand address of the logic product instruction and the contents of the bit accumulator, and the logic product instruction causing said logic product to be stored in the bit accumulator;

a logic sum instruction included in the machine instructions for providing a logic sum of the bit contents stored in the memory means specified by the operand address of the logic sum instruction and the contents of the bit accumulator, and the logic sum instruction causing said logic sum to be stored in the bit accumulator;

a gate instruction, which, when the contents of the bit accumulator have not a logic level of "0", commands the execution of instructions enclosed between the preceding parenthesis denoting the start of a logic or arithmetic operation and the succeeding parenthesis representing the end of the logic or arithmetic operation, and, when said contents have a logic level of "0", suppresses the execution of said instructions;

a counter connected to said processing means for counting in which, to treat instructions issued with respect to a plurality of pairs of parentheses constituting a multiple parenthetical notation, the first mode counting is carried out upon detection of the preceding group of parentheses and the opposite second mode counting is carried out upon detection of succeeding group of parentheses, both counting operations being undertaken when the predetermined conditions are not established with the gate instruction, logic product instruction or logic sum instruction; and means for carrying out the transmission of data between external equipment and the memory means or processing means.

15. A data-processing device comprising:

memory means for storing data and machine instructions;

processing means for carrying out the logic operation on at least 1-bit of data and the arithmetic operation on data formed of a plurality of bits, and, where a predetermined condition is established, suppressing the execution of one or more of the following instructions;

a bit accumulator connected to said processing means for holding the result of the logic operation on at least 1-bit of data, the contents of the bit accumulator being used as the predetermined condition;

a gate instruction, which, when the contents of the bit accumulator have not a logic level of "0", commands the execution of instructions enclosed between the preceding parenthesis denoting the start of a logic or arithmetic operation and the succeeding parenthesis representing the end of the logic or arithmetic operation, and, when said contents have a logic level of "0", suppresses the execution of said instructions;

means connected to said processing means in which, when the preceding parenthesis is specified with a logic product instruction and the contents of the bit accumulator have a logic level of "0", instructions enclosed between the preceding and succeeding parentheses are not executed to shorten the average execution time of instructions included in a processing program; when the preceding parenthesis is specified with a logic sum instruction and the contents of the bit accumulator have not a logic level of 37 0", instructions enclosed between the preceding and succeeding parentheses are not executed; and when the gate instruction is issued and the contents of bit accumulator have a logic level of "0", then instructions enclosed between the preceding and succeeding parentheses are not executed; and means for carrying out the transmission of data between external equipment and the memory means or processing means.

* * * * *